United States Patent
Frank et al.

(10) Patent No.: US 10,369,878 B2
(45) Date of Patent: Aug. 6, 2019

(54) POWERTRAIN CONFIGURATIONS FOR TWO-MOTOR, TWO-CLUTCH HYBRID ELECTRIC VEHICLES

(71) Applicant: Cummins Electrified Power NA Inc., Wilmington, DE (US)

(72) Inventors: Andrew Frank, Davis, CA (US); Joerg Ferchau, Morgan Hill, CA (US); Leonhard Fahreddin, Dixon, CA (US); Julio Razo, Dixon, CA (US); Krishna Kumar, Dixon, CA (US); Anthony Serra, Davis, CA (US)

(73) Assignee: Cummins Electrified Power NA Inc., Wilmington, DE (US)

(*) Notice: Subject to any disclaimer, the term of this patent is extended or adjusted under 35 U.S.C. 154(b) by 0 days.

(21) Appl. No.: 15/210,002

(22) Filed: Jul. 14, 2016

(65) Prior Publication Data

US 2016/0347164 A1 Dec. 1, 2016

Related U.S. Application Data

(63) Continuation of application No. 13/762,860, filed on Feb. 8, 2013, now Pat. No. 9,421,856.

(51) Int. Cl.
*B60K 6/442* (2007.10)
*B60K 6/26* (2007.10)
(Continued)

(52) U.S. Cl.
CPC .............. *B60K 6/442* (2013.01); *B60K 6/26* (2013.01); *B60K 6/405* (2013.01); *B60K 6/52* (2013.01);
(Continued)

(58) Field of Classification Search
CPC ....................................... B60K 6/442
See application file for complete search history.

(56) References Cited

U.S. PATENT DOCUMENTS

| | | | |
|---|---|---|---|
| 5,343,970 A | | 9/1994 | Severinsky |
| 5,845,731 A | * | 12/1998 | Buglione ............. B60K 6/26 |
| | | | 180/65.23 |

(Continued)

FOREIGN PATENT DOCUMENTS

| | | |
|---|---|---|
| CN | 101209667 A | 7/2008 |
| CN | 102381177 A | 3/2012 |

(Continued)

OTHER PUBLICATIONS

Adel, Boukehili, "Simulation and Comparison of HEV Battery Control for Best Fuel Economy and Longer Battery Life", World Electric Vehicle Journal vol. 4—ISSN 2032-6653, 2010, 6 pages.

(Continued)

*Primary Examiner* — Edwin A Young
(74) *Attorney, Agent, or Firm* — Faegre Baker Daniels LLP

(57) ABSTRACT

Powertrain configurations for hybrid electric vehicles (HEV) and plug-in hybrid electric vehicles (PHEV) are disclosed herein. One powertrain comprises: a prime mover; an electric motor-generator, said electric motor-generator mechanically coupled to said prime mover via a first clutch; an electric motor, said electric motor mechanically coupled to said electric motor-generator via a second clutch; a battery, said battery electrically coupled to said electric motor-generator and said electric motor, said battery capable of supplying electrical energy to said electric motor-generator and said electric motor; and a controller, said controller capable of supplying control signals to said prime mover, said first clutch, said electric motor-generator, said second clutch and said electric motor such that said controller is (Continued)

capable of dynamically affecting a plurality of operating modes; wherein further said plurality of operating modes comprises one of a group, said group comprising: all electric mode, series mode, series-parallel mode and parallel mode.

14 Claims, 9 Drawing Sheets

(51) Int. Cl.
*B60K 6/405* (2007.10)
*B60K 6/52* (2007.10)
*B60W 10/02* (2006.01)
*B60W 10/06* (2006.01)
*B60W 10/08* (2006.01)
*B60W 20/20* (2016.01)

(52) U.S. Cl.
CPC ............ *B60W 10/02* (2013.01); *B60W 10/06* (2013.01); *B60W 10/08* (2013.01); *B60W 20/20* (2013.01); *B60Y 2200/92* (2013.01); *B60Y 2300/182* (2013.01); *B60Y 2400/60* (2013.01); *B60Y 2400/82* (2013.01); *Y02T 10/6234* (2013.01); *Y02T 90/14* (2013.01); *Y10S 903/906* (2013.01); *Y10S 903/916* (2013.01); *Y10S 903/93* (2013.01); *Y10S 903/952* (2013.01); *Y10T 477/26* (2015.01)

(56) References Cited

U.S. PATENT DOCUMENTS

| | | |
|---|---|---|
| 5,856,709 A | 1/1999 | Ibaraki |
| 5,982,045 A | 11/1999 | Tabata |
| 6,026,921 A | 2/2000 | Aoyama et al. |
| 6,048,289 A | 4/2000 | Hattori et al. |
| 6,054,844 A | 4/2000 | Frank |
| 6,081,042 A | 6/2000 | Tabata |
| 6,083,139 A | 7/2000 | Deguchi et al. |
| 6,116,363 A | 9/2000 | Frank |
| 6,190,282 B1 | 2/2001 | Deguchi et al. |
| 6,328,122 B1 | 12/2001 | Yamada |
| 6,432,023 B1 | 8/2002 | Ahner et al. |
| 6,569,055 B2 | 5/2003 | Urasawa et al. |
| 6,740,002 B1 | 5/2004 | Stridsberg |
| 6,809,429 B1 | 10/2004 | Frank |
| 6,837,215 B2 | 1/2005 | Nishigaki et al. |
| 6,847,189 B2 | 1/2005 | Frank |
| 6,885,113 B2 | 4/2005 | Lim |
| 6,886,648 B1 | 5/2005 | Hata et al. |
| 6,931,850 B2 | 8/2005 | Frank |
| 6,991,054 B2 | 1/2006 | Takaoka et al. |
| RE39,023 E | 3/2006 | Sasaki |
| 7,021,409 B2 | 4/2006 | Tamor |
| 7,040,433 B2 | 5/2006 | Yamamoto et al. |
| 7,117,963 B2 | 10/2006 | Saito et al. |
| 7,154,236 B1 | 12/2006 | Heap |
| 7,163,480 B2 | 1/2007 | Supina et al. |
| 7,169,074 B2 | 1/2007 | Raghavan et al. |
| 7,196,430 B2 | 3/2007 | Yang |
| 7,217,205 B2 | 5/2007 | Frank |
| 7,249,537 B2 | 7/2007 | Lee et al. |
| 7,261,672 B2 | 8/2007 | Frank |
| 7,315,090 B2 | 1/2008 | Yang |
| 7,467,678 B2 | 12/2008 | Tanaka et al. |
| 7,597,164 B2 | 10/2009 | Severinsky et al. |
| 7,632,202 B2 | 12/2009 | Supina et al. |
| 7,713,166 B2 | 5/2010 | Frank |
| 7,740,119 B2 | 6/2010 | Staudinger |
| 7,908,067 B2 | 3/2011 | Soliman et al. |
| 8,028,778 B2 | 10/2011 | Luo et al. |
| 8,056,663 B2 | 11/2011 | Schoenek |
| 8,057,354 B2 | 11/2011 | Frank |
| 8,062,172 B2 | 11/2011 | Supina et al. |
| 8,083,016 B2 | 12/2011 | Naik et al. |
| 8,152,671 B2 | 4/2012 | Tiwari |
| 8,215,425 B2 | 7/2012 | Hayashi et al. |
| 8,215,426 B2 | 7/2012 | Katsuta et al. |
| 8,234,025 B2 | 7/2012 | Conion |
| 8,251,850 B2 | 8/2012 | Phillips |
| 8,307,924 B2 | 11/2012 | Wang et al. |
| 8,474,556 B2 | 7/2013 | Wang |
| 8,540,601 B2 | 9/2013 | Wang et al. |
| 8,833,324 B2 | 9/2014 | O'Brien et al. |
| 8,845,482 B2 | 9/2014 | Zhang et al. |
| 8,997,480 B1 | 4/2015 | Bennett |
| 9,045,136 B2 | 6/2015 | Frank et al. |
| 2001/0039230 A1 | 11/2001 | Severinsky et al. |
| 2006/0048983 A1 | 3/2006 | Urakabe |
| 2007/0276556 A1 | 11/2007 | Houle |
| 2008/0096717 A1 | 4/2008 | Houle |
| 2008/0223636 A1 | 9/2008 | Gutsche |
| 2008/0223837 A1 | 9/2008 | Bartilson |
| 2009/0145674 A1 | 6/2009 | Lee |
| 2009/0221390 A1 | 9/2009 | Houle |
| 2010/0099532 A1* | 4/2010 | Cashen ............ B60K 6/365 475/5 |
| 2011/0287888 A1 | 11/2011 | Muller |
| 2011/0305550 A1 | 12/2011 | Haire |
| 2012/0077632 A1 | 3/2012 | Babbitt et al. |
| 2012/0198962 A1 | 8/2012 | Houle |
| 2012/0309587 A1 | 12/2012 | Nozaki |
| 2013/0324357 A1 | 12/2013 | Stenson |
| 2014/0228165 A1 | 8/2014 | Frank et al. |
| 2014/0228167 A1 | 8/2014 | Frank et al. |
| 2014/0256505 A1 | 9/2014 | Dalum et al. |

FOREIGN PATENT DOCUMENTS

| | | |
|---|---|---|
| CN | 204136757 U | 2/2015 |
| JP | 2011025858 A | 2/2011 |
| WO | WO2009009822 A1 | 1/2009 |
| WO | WO2012082063 A1 | 6/2012 |
| WO | WO2012152613 A1 | 11/2012 |

OTHER PUBLICATIONS

International Search Report and Written Opinion issued by the ISA/US, Commissioner for Patents, dated May 22, 2014, for International Application PCT/US2014/014215; 14 pages.

International Preliminary Report on Patentability issued by the International Bureau of WIPO, dated Aug. 11, 2015, for International Application PCT/US2014/014215; 13 pages.

International Search Report and Written Opinion issued by the ISA/US, Commissioner for Patents, dated Aug. 12, 2014, for International Application PCT/US2014/014234; 14 pages.

International Preliminary Report on Patentability issued by the International Bureau of WIPO, dated Aug. 11, 2015, for International Application PCT/US2014/014234; 13 pages.

* cited by examiner

POWERTRAIN CONFIGURATIONS FOR TWO-MOTOR, TWO-CLUTCH HYBRID ELECTRIC VEHICLES

CROSS-REFERENCE TO RELATED APPLICATIONS

The present application is a continuation of, and takes benefit of, application Ser. No. 13/762,860 which is incorporated by reference in its entirety.

BACKGROUND

In the field of electric vehicles (EVs), hybrid electric vehicles (HEVs) and plug-in hybrid electric vehicles (PHEVs), there are many possible powertrains that may affect a wide variety of operating modes. For example, in the field of HEVs alone, HEV powertrains may be constructed to affect series, parallel, series-parallel modes of operation. In addition, certain of these modes may be constructed to operate according to different policies,—e.g., charge-sustaining, charge-depletion and the like.

These different modes and policies offer certain advantages—e.g., range extension, fuel efficiency, operation of the internal combustion engine (ICE) on its ideal-operating line (IOL). It would be desirable to have a single powertrain that may affect a plurality of these modes—possibly during different drive conditions and possibly with different policies, according to a desired drive characteristic metric, such as fuel efficiency, range extension, efficient battery usage or the like.

In addition, it may be desirable to have a hybrid electric powertrain configuration that has substantially the same form factor for conventional passenger cars and light-to-heavy-duty truck vehicle configurations. In such a case, the cost to produce advanced hybrid electric vehicles may be reduced by substitution without costly changes to the production line.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for powertrain configurations for hybrid electric vehicles (HEV) and plug-in hybrid electric vehicles (PHEV). In one embodiment, a powertrain comprises: a prime mover; an electric motor-generator, said electric motor-generator mechanically coupled to said prime mover via a first clutch; an electric motor, said electric motor mechanically coupled to said electric motor-generator via a second clutch; a battery, said battery electrically coupled to said electric motor-generator and said electric motor, said battery capable of supplying electrical energy to said electric motor-generator and said electric motor; and a controller, said controller capable of supplying control signals to said prime mover, said first clutch, said electric motor-generator, said second clutch and said electric motor such that said controller is capable of dynamically affecting a plurality of operating modes; wherein further said plurality of operating modes comprises one of a group, said group comprising: all electric mode, series mode, series-parallel mode and parallel mode.

In other embodiments, the powertrain further comprises a housing that contains at least two or more components of the powertrain. One such housing is mechanically mated to the vehicle and provides housing to at least one or more components of the powertrain. Such a housing may provide for environmental protection, shock protection, electro-magnetic interference protection to such powertrain components.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
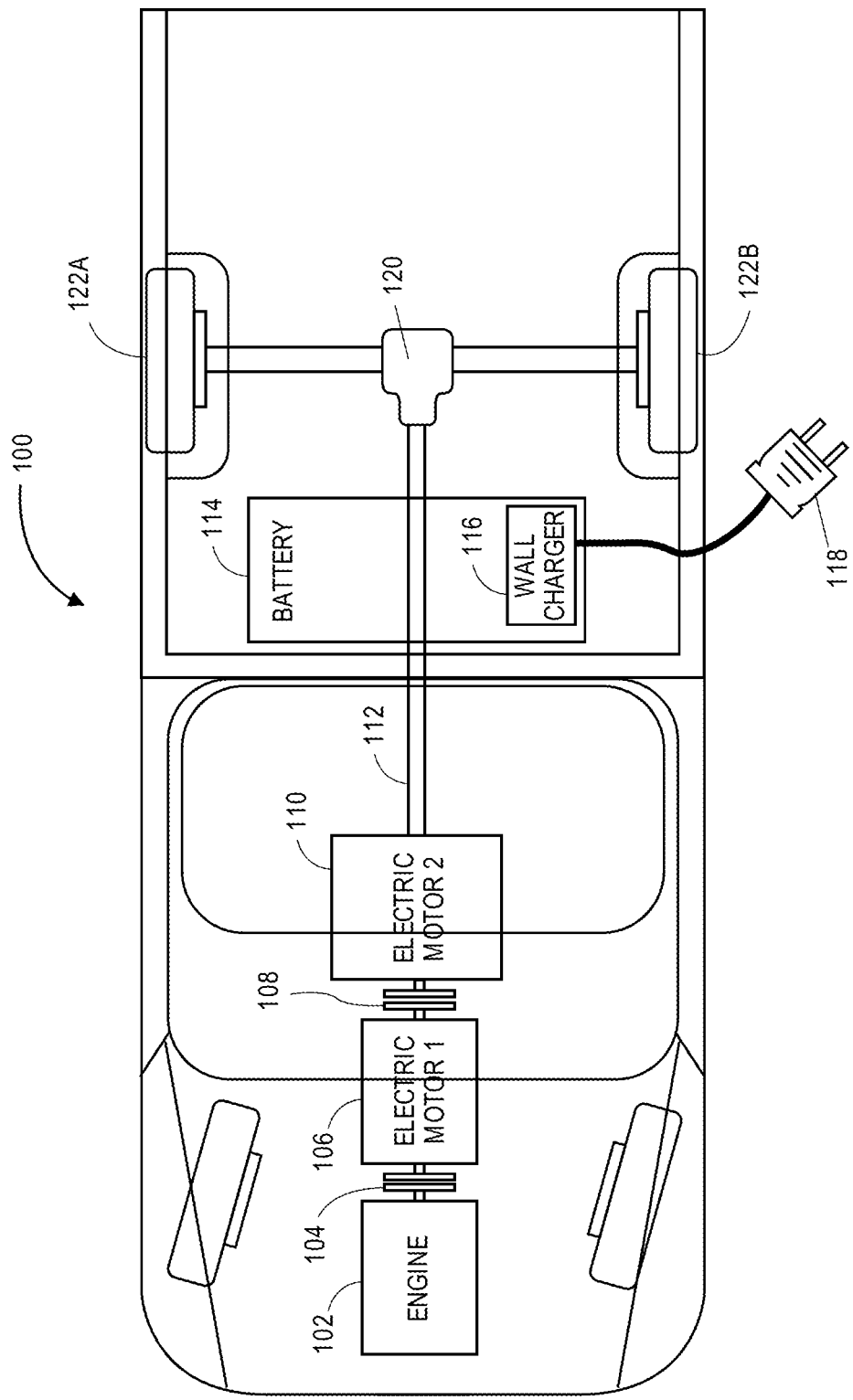
FIG. 1 shows one possible embodiment of a plug-in hybrid electric vehicle, as made according to the principles of the present application.

As utilized herein, terms "controller," "system," "interface," and the like are intended to refer to a computer-related entity, either hardware, software (e.g., in execution), and/or firmware. For example, a controller can be a process running on a processor, a processor, an object, an executable, a program, and/or a computer. By way of illustration, both an application running on a server and the server can be a controller. One or more controllers can reside within a process and a controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In one embodiment, powertrain configurations are provided herein that comprise a number of components that may further comprise the physical powertrain of Hybrid Electric Vehicles (HEV) and Plug-in Hybrid Electric Vehicles (PHEVs) alike. For example, in many embodiments, there may comprise a gasoline engine, fuel cell or some Prime Mover (PM) that runs on some form of fuel (e.g., gaseous or liquid or the like). In addition, there may be one or more Electric Motors (EM or M) to provide motive power via stored electrical energy in a battery, capacitor, supercapacitor or the like.

For example, FIG. 1 is one possible embodiment of a possible vehicle and/or powertrain platform (100)—among many possible vehicle and/or powertrain embodiments. As shown in FIG. 1, vehicle 100 comprises a dual clutch HEV/PHEV that has the ability to operate as an all-electric vehicle, a hybrid vehicle or a plug-in hybrid electric vehicle. Engine (or any suitable PM) 102 is placed on a common driveshaft 112 with two electric motors 106 and 110. In between engine 102 and motor 106 is clutch 104 and between motor 106 and motor 110 is clutch 108. Clutches 104 and 108, as will be discussed in further detail below, may be actuated in order to affect different modes of operation of vehicle 100.

Battery 114 powers motors 106 and 110 with electric charge. Battery 114 may acquire its electric power via on-board charging (e.g. with engine 102 and motor 106), regenerative braking (e.g. with motor 110, either alone or in combination with motor 106) or via an optional wall charger 116. Wall charger 116 may take electrical energy off a wall socket and charger 116 may be designed according to the local standard for grid distribution.

Driveshaft 112 delivers mechanical power to and from final drive 120—which then delivers such power to the wheels 122a and 122b, which are rear wheels in this embodiment. Final drive 120 may comprise a differential—in optional combination with additional gearing, such as, from a manual transmission, automatic transmission, continuously variable transmission (CVT) whether mechanical or electronic, or power split device (PSD) as is used in the Toyota Prius vehicle. In addition, it should be appreciated that front wheel or all-wheel drive embodiments are also possible embodiments and are under the scope of the present application. Other possible embodiments might include: (1) a front engine/2 motor front wheel drive configuration; (2) a front engine/one or two motor/variable transmission (e.g., CVT, automatic transmission, manual transmission, electronic transmission, planetary gear transmission and the like) configuration; and (3) a front engine/one motor transmission and a rear motor transmission configuration.

In one embodiment, motor 110 may have a higher power rating than motor 106. The power and/or torque rating of the two motors may be adjusted for the application of the vehicle; but in one embodiment, motor 106 may be ½ (or some other proportion) of the power and torque of motor 110 and the PM 102 may be approximately the power of motor 106. In another embodiment—where the All Electric Mode may have a higher performance than under ICE operation—then the ICE and motor 106 can be much smaller than motor 110. Such a vehicle may be used in special circumstances where there is limited charging infrastructure to provide electric energy for all electric operation.

In yet another embodiment, both motors 106 and 110 may be downsized for cost/weight reduction. In such an embodiment, it may be desirable to operate both motors 106 and 110—with clutch 104 closed more often, so that there would be sufficient torque available upon vehicle launch and/or up a desirable grade (e.g., 30% grade). Such sizing of motors may be designed in particular with the size, weight and/or desired functionality (e.g., passenger vehicle, light duty truck, delivery vehicle or the like) of the vehicle in mind.

Figure 2:
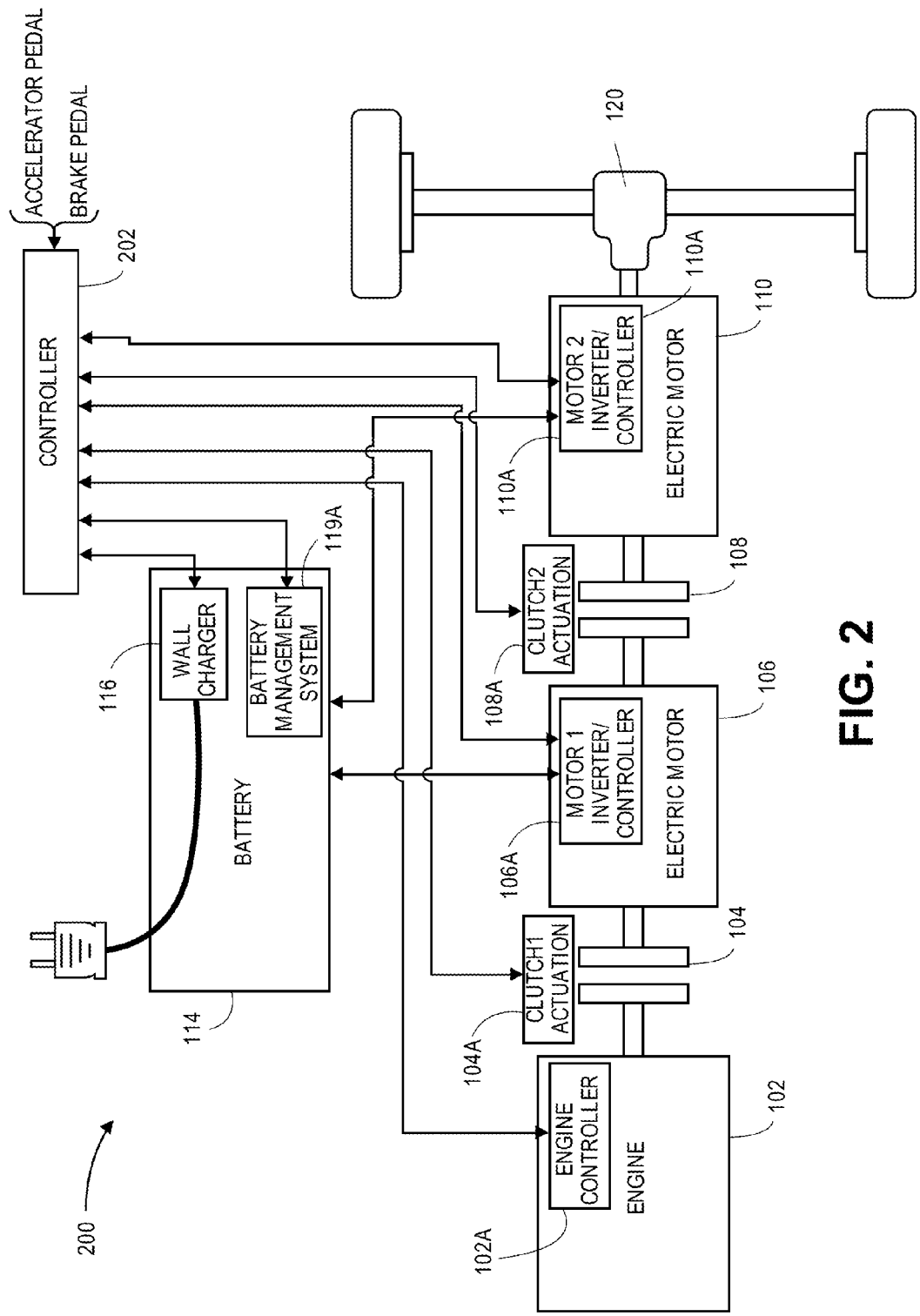
FIG. 2 shows one possible embodiment of an architecture of the powertrain of a plug-in hybrid electric vehicle as made according to the principles of the present application.

FIG. 2 depicts one embodiment of one possible control system 200 for a vehicle and/or powertrain made in accordance with the principles and/or design of FIG. 1. Controller 202 may comprise a suitable combination of hardware, firmware and/or software to input a number of system signals and output a number of control signals to affect the desired operation of vehicle 100. Signals may be input from sensors and/or actuators into controller 202 from a CAN bus architecture, as is known in the art. Possible signals input into controller 202 may comprise: speed of vehicle, speed of drive shaft, speed of crankshaft, state of charge (SOC) of the battery, driver demands via accelerator pedal and brake pedal actuation, clutch slip state, etc.

Other signals for the controller 202 may also include the following:

(1) Outside electric charger information, i.e., Level 1, 2, and other features such as time of charge, Grid to car, car to grid, Charge history, etc.

(2) Battery management system information such as State of Charge (SOC), Temperature of the pack and the individual cells, State of health (SOH), SOC and temperature history, instantaneous power capability, etc.

(3) Engine controller data, such as SOH, fuel use, speed, throttle, temperature, etc.

(4) Clutch 1 data such as, Open/Closed, engine start/series operation, temperature, etc.

(5) Electric motor 1 (M1) data such as, Motor or generating, On/Off, speed, torque, temperature, etc.

(6) Clutch 2 data such as, Open/Closed, M1+M2electric, Engine +M1+M2 parallel, Engine +M1 to M2 Series operation temperature, etc.

(7) Electric motor drive with M2 including data such as one motor drive, 2 motor drive, series operation, parallel operation temperature, etc.

Other system signals and/or control signals may be connected to controller 202 via various interfaces and/or subsystem controllers, such as engine controller 102a, clutch actuations 104a and 108a, motor controllers 106a and 110a, and battery management system 119a. It may be appreciated that controller 202 may input other signals and send control signals from other sensors and/or actuators.

Embodiments of Powertrain Configurations

As shown in FIGS. 1 and 2, a two-motor, two-clutch configuration in a HEV/PHEV may provide the desired drive and efficiency operations for such an advanced vehicle. It may be desirable if the powertrain shown in FIG. 1 had substantially the same form factor as a conventional powertrain. In that case, cost savings may be realized by a manufacturer of such vehicles, if the amount of changes were minimal to switch production from conventional vehicles to advanced HEV/PHEV vehicles.

Figure 3A:
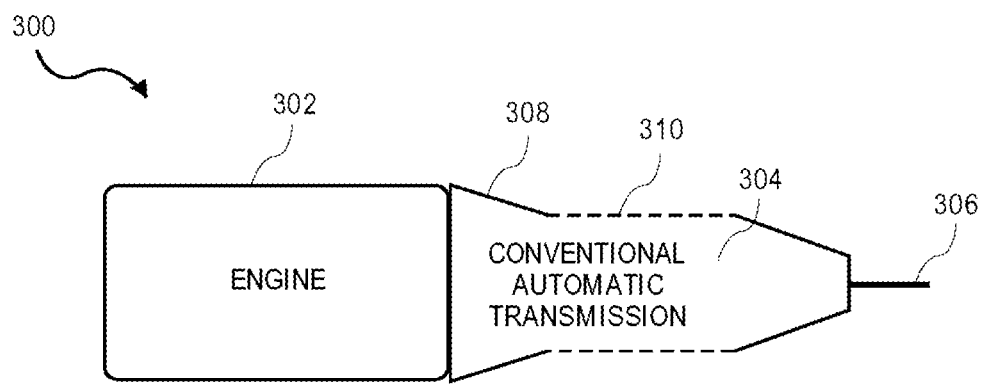
FIGS. 3A and 3B give a side-by-side comparison of a conventional powertrain with a powertrain configuration as made in accordance with the principles of the present application, respectively.
Figure 3B:
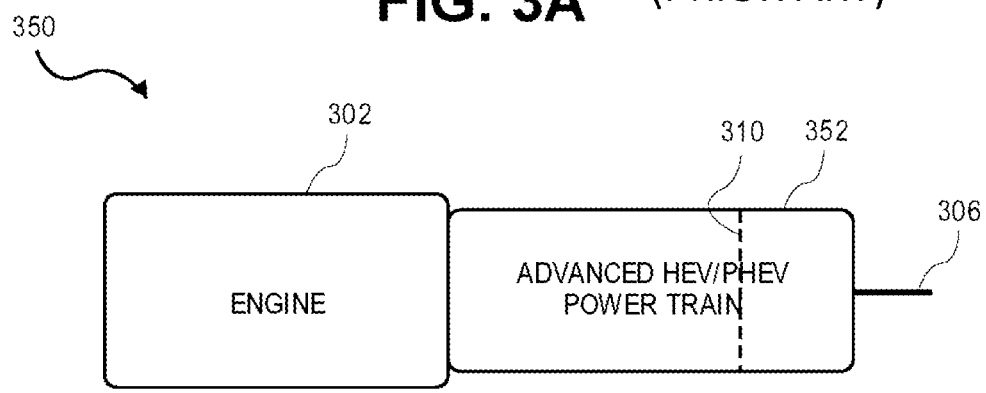

FIGS. 3A and 3B show a side-by side comparison with a conventional powertrain with an advanced powertrain as made in accordance with the principles of the present application, respectively. FIG. 3A shows a conventional powertrain 300 comprising an engine 302 with a conventional automatic (or other type, e.g., manual/CVT/electronic or the like) transmission 304. Drive shaft 306 appears aft of the transmission 304 and extends further back to drive the rear wheels.

Merely for the purposes of exposition, the length dimension of this conventional powertrain may be on the order of 60 inches. This dimension is typical of many different types of vehicles. As may be seen, the automatic transmission has roughly the same cross-sectional area as the engine 302. Often, from the place where the engine mates with the transmission, the transmission exhibits a slight taper 308 to middle section 310 having a middle cross-section.

FIG. 3B depicts a powertrain configuration as made in accordance with the principles of the present application. Powertrain 350 may comprise an engine 302—which may be sized differently for the powertrain 350, as it might for powertrain 300. In one embodiment, the engine for the HEV/PHEV may be downsized in power as well as size, as the electric motors together with the engine provide sufficient peak power and/or torque—e.g., if powertrain 350 were to be placed in the same vehicle bed as powertrain 300 as a substitute.

As may be seen in FIG. 3B, advanced HEV/PHEV powertrain 350 replaces the conventional transmission (e.g., automatic or manual) 300 in the powertrain configuration. If advanced powertrain 350 is designed to substitute for conventional powertrain 300 designed for a particular vehicle and/or truck, then it would be desirable to design powertrain 350 to fit properly—i.e., on the undercarriage of the vehicle—with all of the appropriate mounts that might be found on powertrain 300 to hold powertrain 350 sufficiently in place.

The following are embodiments of particular powertrains that are specified according to vehicle class:

Common components of these four embodiments comprise engine 402, clutch 1 (414), electric motor M1 (416), clutch 2 (418), electric motor M2 (412) and drive shaft 406. As may be seen and is further discussed in commonly owned patent application Ser. No. 13/762,731, entitled "SYSTEMS AND METHODS FOR IMPLEMENTING DYNAMIC OPERATING MODES AND CONTROL POLICIES FOR HYBRID ELECTRIC VEHICLES" (and herein incorporated by reference), these components are mated mechanically and may be controlled with a set of robust operational modes. Such robust operational modes (e.g., All Electric Mode, Parallel Hybrid Mode, Series Hybrid Mode and their transitions between them) provide for a vehicle with sufficient power, range, acceleration, fuel economy to provide sufficient owner satisfaction—e.g., to match or exceed conventional drivetrain performance.

For example, these driving modes including: electric drive, parallel hybrid drive, and series hybrid drive and any combination of those may be realized by the combination of one or more motors, generators, and clutching systems which can operate as EV, parallel hybrid, or series hybrid, or a combination thereof through applying electric power and the opening and closing of clutches (possibly by actuators 415 or other mechanisms) via software control provided under the control of a central drivetrain supervisory controller or under the control of a transmission controller.

Both motors may function as traction motors (i.e., a High Torque Electric Mode) or, alternatively, electrical generators

| Vehicle Type/Weight (Gross Vehicle Weight) | Engine | Traction Motor (kW) | Motor/Generator (kW) | Battery Capacity (kWh) |
|---|---|---|---|---|
| Light Duty Truck (6000 to 10,000 lbs +/− 1000 lbs) | 2.7 L, 85 kw/ 3200 rpm, 300 Nm/ 1800-2400 rpm | >900 Nm peak >80 kW peak, Max speed >4500 rpm | >300 Nm peak, >50 kW peak, Max speed >4500 rpm | 5 to 21 (+/−10) |
| Heavy Duty Truck (14,000 to 26,000 lbs +/− 1000 lbs) | 4.5 L, 103 kw/ 2500 rpm, 550 Nm/ 1400 rpm | >1400 Nm peak >110 kW peak, Max speed >4500 rpm | >600 Nm peak, >50 kW peak, Max speed >4500 rpm | 5 to 27 (+/−10) |
| Medium Duty Truck (10,000 to 14,000 lbs +/− 1000 lbs) | 2.7 L, 88 kw/3600 rpm, 250 Nm/ 2000 rpm | >1200 Nm peak, >90 kW peak, Max speed >4500 rpm | >400 Nm peak, >50 kW peak, Max speed >4500 rpm | 5 to 24 (+/−10) |
| Light Duty Truck/Car (less than 6000 lbs +/− 1000 lbs) | 2.0 L, 90 kw/6000 rpm, 167 Nm/4000 rpm | >500 Nm peak, >50 kW peak, Max speed >4500 rpm | >200 Nm peak, >50 kW peak, Max speed >4500 rpm | 5 to 16 (+/−10) |
| Extra Light Duty Vehicle (less than 4000 lbs +/− 1000 lbs) | Less than 1.0 L to 0.5 L engine (gasoline, Diesel or natural gas), 50 kW/5000 rpm or less -- | >300 Nm, peak >75 kW, peak Max speed 5000 rpm | >200 Nm, peak >35 kW, peak Max speed >5000 rpm | 2 to 16 (+/−10) |

As was mentioned, advanced powertrain 350 may comprise a plurality of components e.g., electric motors, clutches, actuators, Continuously Variable Transmission (CVT), planetary gearing transmissions and the like. In particular, FIGS. 4A through 4D disclose four particular advanced powertrains 400, 450, 460, and 470, respectively.

(i.e. a High Regeneration Mode) at any given time—e.g., depending on the drive cycle, vehicle status and the power/torque needs of the driver. They can be combined to operate as traction motors or one or more may be used as a generator for typical charging needs or multi-generator for fast charging needs. Clutches may be software controlled so that the system can automatically shift between EV, parallel, series, or full charging modes with or without driver participation. The clutches may be dry or wet clutches and may be electromechanically, hydraulically, mechanically and/or manually actuated.

Control systems may comprise algorithms and methods to speed match motors and generators in order to maximize clutch and clutch material life and also to promote the best driver experience through reducing torque transients or other tactile events back to the vehicle and/or driver. Control systems may also comprise algorithms for controlling motor and generator speeds and closely matching those prior to engaging clutch systems. The speed synchronization may be accomplished through software commands or through using internal speed sensing and/or control components. The system may also be manually controlled with automatic clutch synchronization.

In addition to having common components, the four powertrain embodiments seek to fit onto the vehicle platform with a substantially same dimensioning as with the conventional powertrain. In addition, it may be desirable for advanced powertrains to have substantially similar geometries. Thus, advanced powertrains may be designed to have the same general size and shape as a conventional internal combustion engine and transmission combinations. This tends to facilitate the production of advanced powertrains in existing vehicle designs without having to make major modifications to those vehicles. As such, these advanced powertrains tend to save time to market, reduce development cost and may allow for retrofitting or repowering existing conventional vehicles with EV, Parallel HEV, and Series HEV functionality.

Figure 4A:
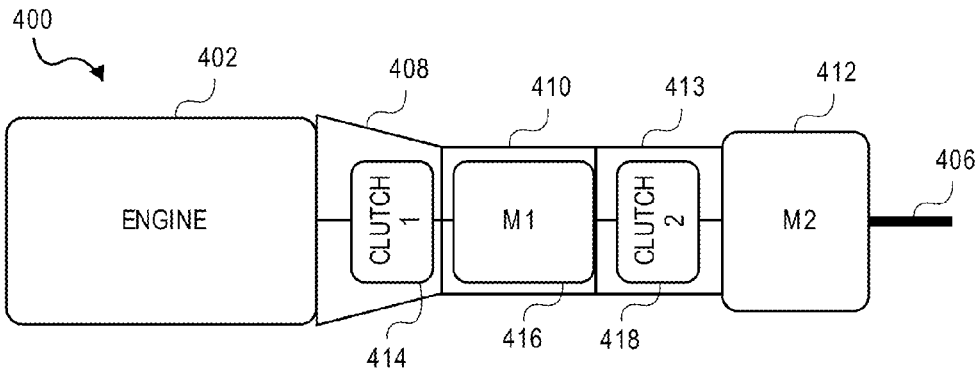
FIGS. 4A through 4D depict various embodiments of powertrain configurations made in accordance with the principles of the present application.
Figure 4B:
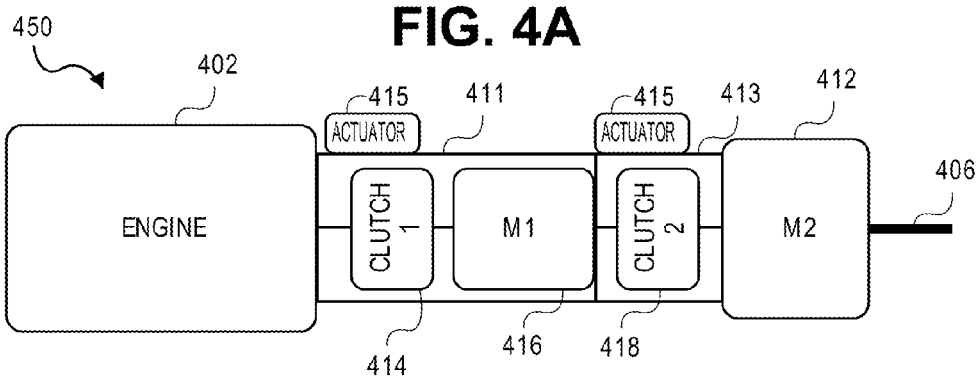
Figure 4C:
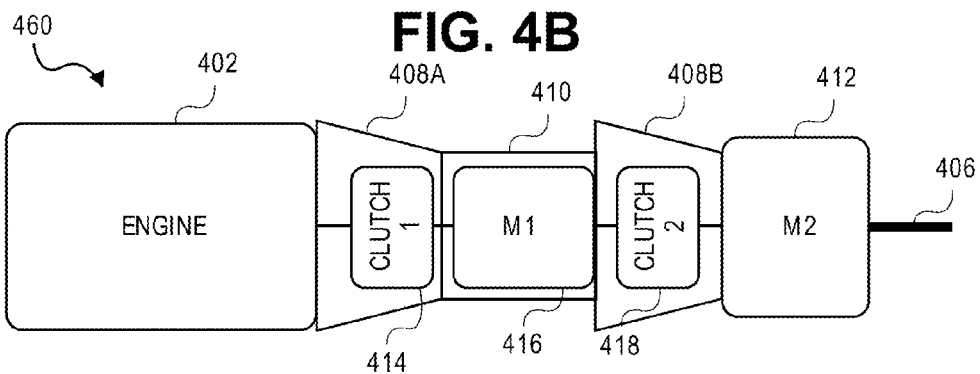
Figure 4D:
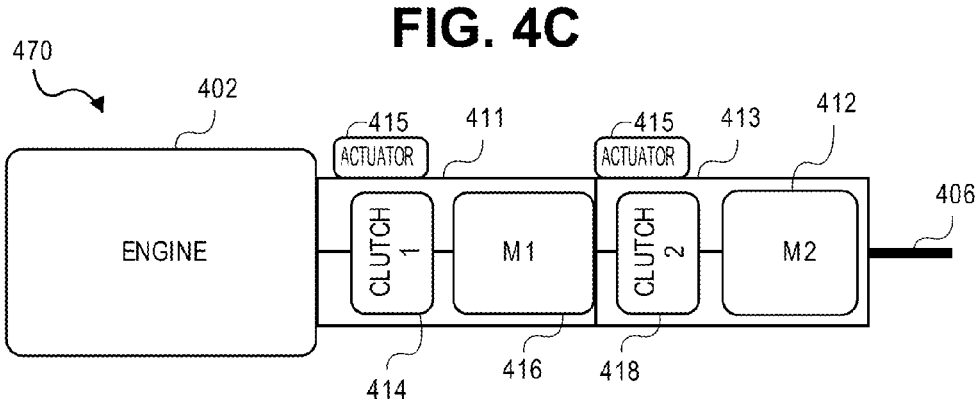

There are many possible geometries to possibly employ. For example, in the embodiment of FIG. 4A, it may be desirable to have a housing comprising a tapered section and/or bell housing 408, a middle section 410 and an end section 413. This housing may cover clutch 1, M1, clutch 2—and possibly M2, as desired. Middle section 410 may tend to relieve strain on M1's case as well. FIG. 4B depicts the housing without a taper—but having actuators 415 on the outer surface of the housing (e.g., either separately mounted or integral to the housing). In FIG. 4C, there may be common tapered sections/bell housing 408a, 408b. Alternatively, there may be no tapered sections and all components housed in one or multiple sections, such as depicted in FIG. 4D.

One Embodiment

Figure 5:
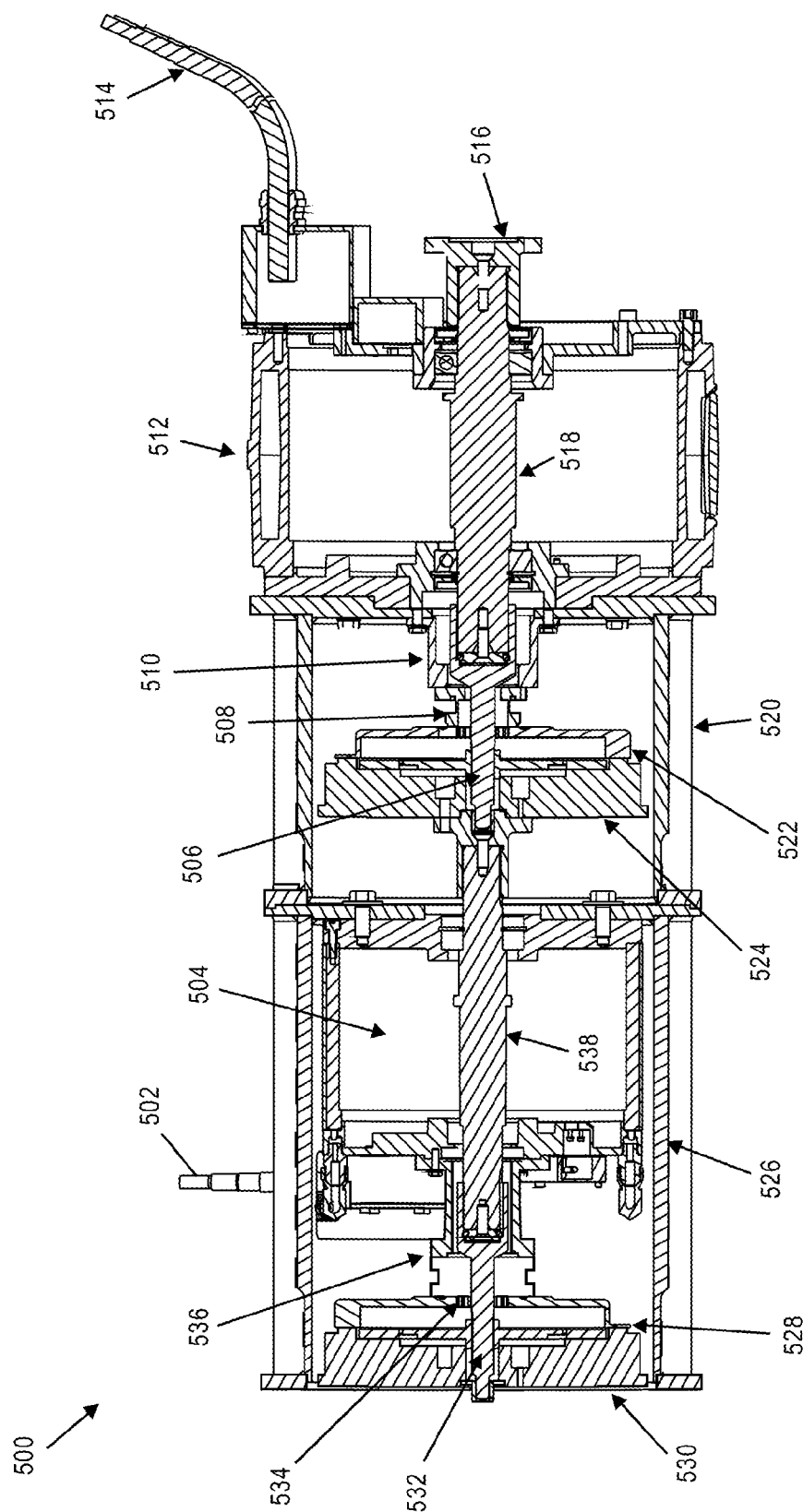
FIG. 5 shows a cross-sectional view of one possible powertrain made in accordance with the principles of the present application.

FIG. 5 shows a cross sectional view of one possible embodiment of an advanced powertrain 500, as made in accordance with the principles of the present application. Powertrain 500 comprises various components such as EM1, EM2, clutch 1, clutch 2. Starting from left-to-right, adapter shaft 532 may extend from housing 520 and be used to mate powertrain 500 to an engine (not shown in FIG. 5). Clutch 1 may comprise flywheel 530, clutch/pressure plate 528, release bearing 534, release bearing mount 536. Adapter shaft 532 is mechanically mated to a through-shaft 538 in EM 1 (504). In one embodiment, EM1 may be mated to housing 526 by any means known in the art (e.g., bolts, welds, or the like). EM1 may be electrically mated to the powertrain via a 3-phase port (502). For cooling purposes, cooling fluids may also be passed through port 502.

Through-shaft 538 of EM1 may be mechanically mated to adapter shaft 506 via clutch 2. Clutch 2 may itself comprise a flywheel 524, clutch/pressure plate 522, release bearing 508 and release bearing mount 510. In this embodiment, clutch 2 is also contained with housing 520. Both Clutch 2 shaft 506 and Clutch 1 shaft 532 may have a sealed long life "pilot" bearing mounted in flywheels 524 and 530 respectively. These bearings may be used for the purposes of alignment and may not have to carry a radial load. EM2, as shown in FIG. 5, may be mechanically mated to housing 520 via any means known in the art. EM2 (512) may comprise through-shaft 518 and may be electrically mated to the powertrain via 3-phase port 514. Power from powertrain 500 may be further communicated to the rear via an adapter flange 516 to a driveshaft (not shown).

Various Housing Embodiments

In many of the embodiments disclosed herein, there is a housing to which various components are mechanically mated—e.g., EMs, clutches, actuators and the like. In one embodiment, a suitable housing may comprise a tubular structure which provides suitable mounting, interconnection, environmental, installation, and operational functions. Housings may be designed to conform to traditional vehicle body styles such the advanced powertrain may be fitted into existing and/or conventional transmission tunnels and/or vehicle frames.

In many embodiments, a housing may provide physical protection and component reinforcement structure—designed to provide protection against road hazards, water, blasts (e.g., for military applications). A housing may also serve as the structural part of the system—thereby minimizing stress on motors, generators, clutch systems which could be experienced from the vehicle dynamics, frame and body twisting or bending, etc. In addition, a housing may also extend the life and durability of motors, generators, and clutch components. A housing may also allow the use of lighter duty components that may not need to be designed to survive all the vehicle torsional and dynamics via their own design.

The housing may desirable allow for radially and axially aligning of components, such as clutch components, flywheels, electric motors, electric generators with respect to each other for ease of assembly and long term reliability and may also comprise physical mounting interface for an internal combustion engine and a propeller shaft or other power transmission device.

In other embodiments, housing may be structurally reinforced with tubular shape and stiffening ribs (not shown) in order to minimize flex of the assembly with reduced system weight. In addition, housing may provide suitable interface for software controlled clutch actuators—which may be any means known in the art, e.g., mechanical, electrical, pneumatic, or any combination of those.

In one embodiment, the housing may be of modular design—whereby the housing may not necessarily be of a unitary design (i.e., housing all or substantially all of the various components of the powertrain). It may be possible that the housing comprises different portions—where one portion may house or otherwise contain one or more of the components of the powertrain (and, possibly, without regard as to whether any of the components come stock with their own separate housing structure). It may be possible that the portions cover and protect one or more such powertrain components. In addition, each of these portions may be mechanically mated to each other (e.g., by bolts, screws, welds or the like). Alternatively, each portion may be mechanically mated to the vehicle itself and the portions placed such that each provides protection to one or more components of the powertrain.

Electro-Magnetic Compatibility (EMC)

Another aspect to a housing which may be common to one or more components of the powertrain is the ability to provide a degree of EMC. It is known in the art of power electronics that Electro-Magnetic Interference (EMI) and Radio-Frequency Interference (RFI) issues are potentially present in such a powertrain design.

Thus, in many embodiments of the present application, it may be desirable to have the housing as a structure that may provide a high integrity, common electrical ground for motors and generators and other electronics requiring low impedance path to ground and a common ground to other components. To provide possible EMC, the housing may comprise the use of materials for attenuating both E field and H field radiated emissions. For example, one embodiment may uses Aluminum—which may itself be overplated with copper and Nickel or Chrome. Other embodiments may include other layering possibilities or materials to provide such suitable EMC profiles. In addition, electrical and control cables routed to the housing structure may comprise effectively grounding gross cable shields to minimize interference from radiated emissions.

Cooling Systems and Management

Figure 6:
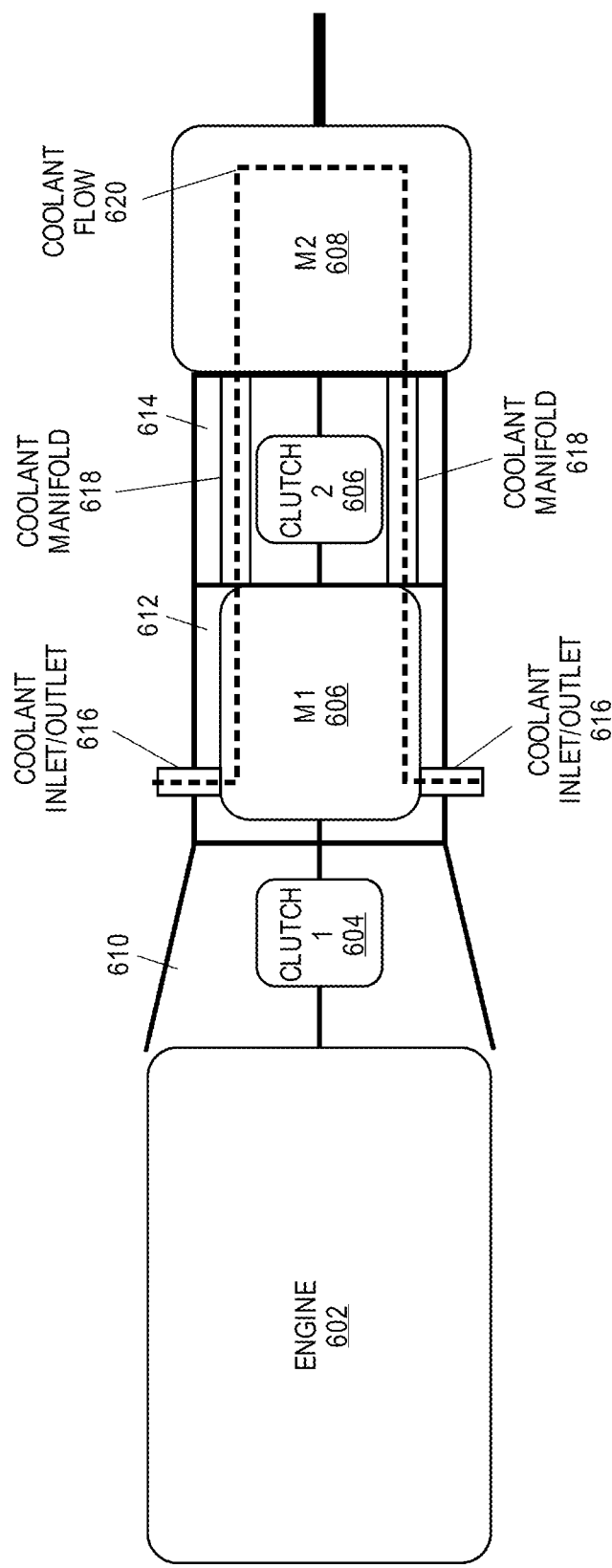
FIG. 6 depicts one embodiment of a powertrain and its associated cooling loop made in accordance with the principles of the present application.

FIG. 6 is one embodiment of a cooling and/or thermal management system made in accordance with the principles of the present application. Cooling system may be incorporated into housing 610 comprising cooling inlet/outlet ports 616 that input and output cooling fluid, routing through Motor 1 (612), through a coolant manifold 616 past clutch 2, and through Motor 2 (608). It may be the case that Motors 1 and/or 2 may have cooling manifolds built-in from the manufacturer—and if so, the present cooling system may seek to use these existing manifolds. If not, other manifolds may be constructed to be in thermal communication with the motors in order to provide sufficient cooling.

As may be seen, coolant manifold 616 may be constructed to be in thermal communication with Clutch 2—in order to move heat away from the clutch. It will be appreciated that another coolant manifold may be similarly constructed to cool Clutch 1.

In such embodiments, it may be desirable to include cooling pathways to provide for heat sinking the motors-generators and other components together to reduce thermal gradients throughout the system and to promote better cooling when the system is shut down and no longer has cooling fluid being pumped through the components. Such cooling pathways and cooling manifolds may comprise pipes and/or conduits (or other such plumbing) to connect to one or more radiators (not shown) to rid the system of excess heat.

In other embodiments, it may be desirable to include cooling pathways to ensure that components are not too cool for optimal operation. Heat management (i.e., whether cooling or heating components) may be applied to the batteries, the motors, clutches, electrical controllers and any other heat-generating or heat-sensitive elements. It is desirable to have all such components operating at the most efficient temperature range—which may differ from each other. In such cases, it may be desirable to route heat from components that are in need of cooling to components that may be in need of heating.

Other Configurations and Embodiments

Apart from the rear-wheel drive configuration shown in previous figures, it may be desirable to use this powertrain to power front-wheel drive (FWD) or all-wheel drive (AWD) configurations.

Figure 7:
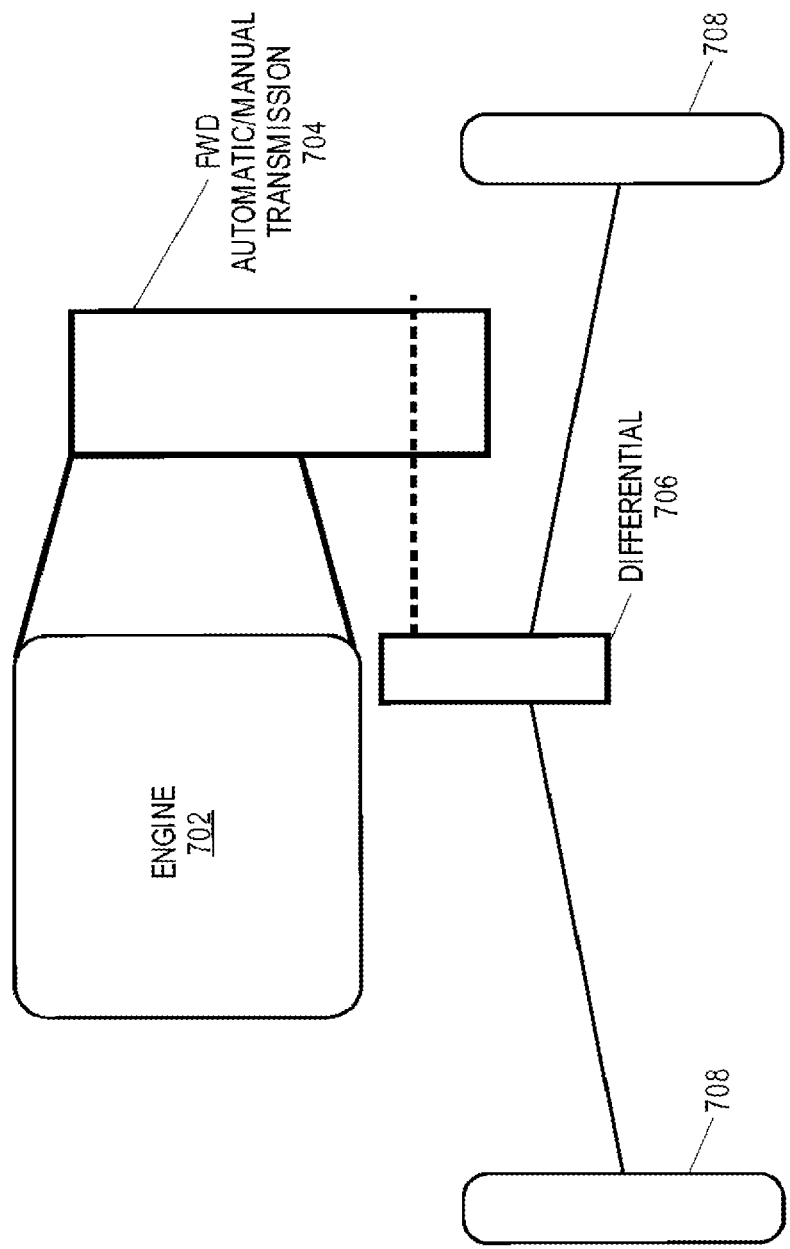
FIG. 7 depicts a conventional powertrain for a front wheel drive vehicle.
Figure 8:
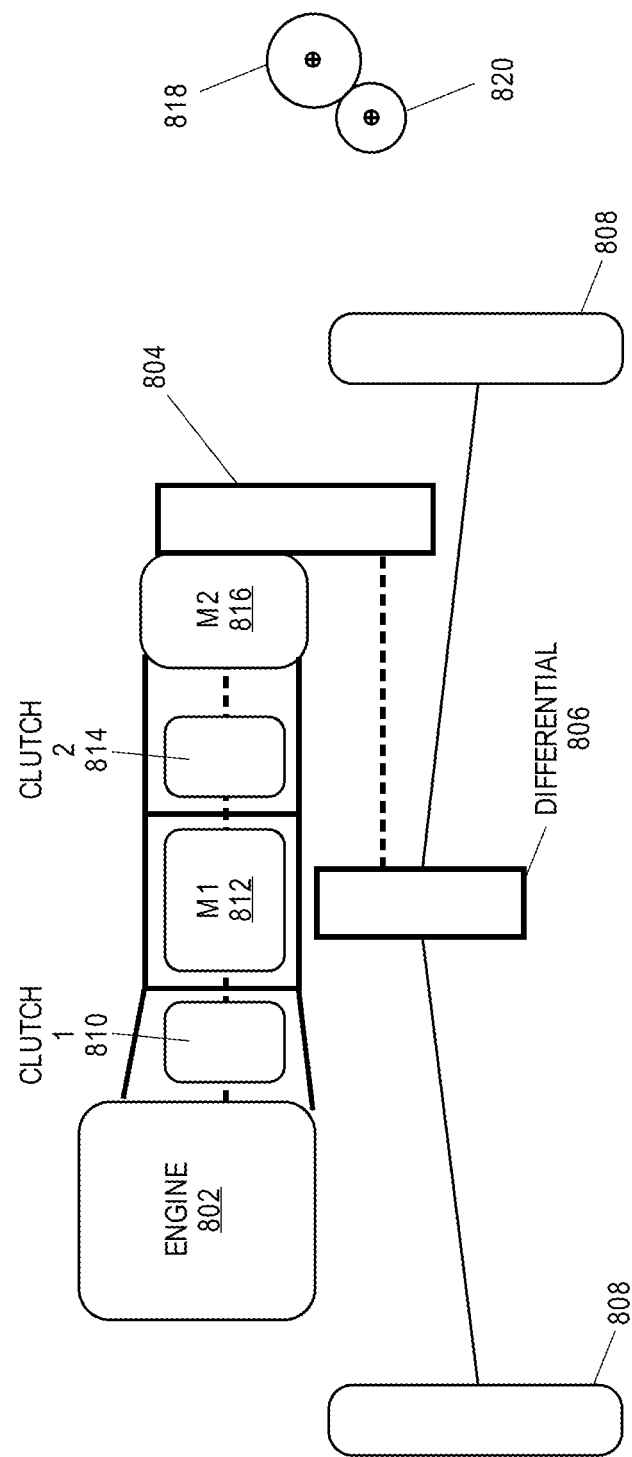
FIGS. 8 and 9 depict embodiments of front wheel drive powertrains made in accordance with the principles of the present application.

FIG. 7 shows a conventional powertrain that comprises an engine 702, FWD transmission 704 and a differential 706—in mechanical communications with wheels 708. To contrast with this conventional powertrain, FIG. 8 shows one embodiment of powertrain which may be suitable for FWD applications. Engine 802 may be mated to Clutch 1 (810), Motor 1 (812), Clutch 2 (814) and gearing 804. Gearing 804 may provide suitable transmission from the mid-to-rear portion of the vehicle to the front wheels. Gearing 804 may be affected by gears 818 and 820, as depicted. The transmission of power and/or torque may thereafter be delivered to the differential 806 and, thus, to front wheels 808. It should be appreciated that the gear set 818, 820 may be replaced by a power chain and sprockets. This substitution may be dependent on the direction of rotation of the components.

Figure 9:
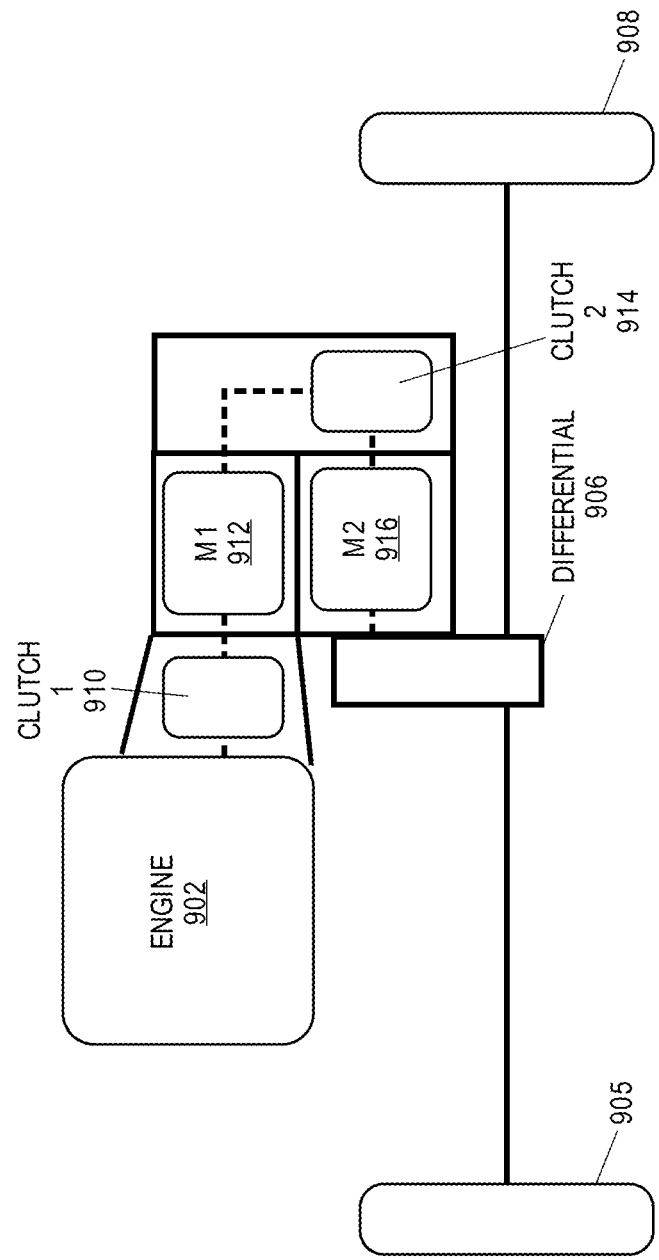

FIG. 9 is yet another embodiment of a FWD configuration. It may be seen engine 902 is connected to clutch 1 (910) which may be coupled to through shaft motor M1 (912) whose shaft may be connected to a sprocket and chain set to another sprocket connected to clutch 2 (914). Clutch 2 (914) may be mounted on motor M2 (916) whose through shaft is connected to the differential gear set 906. It should be appreciated that the described sprocket and chain set may be replaced by gears as in FIG. 8. In addition, clutch 2 (914) may be mounted on Motor M1 instead of Motor M2 for the same function.

Many of the embodiments herein may have its housing be designed for physical protection of the components contained therein and be a reinforcement structure which may be designed to provide protection against road hazards, water, blasts (e.g., military or civilian protections applications). Also, the housing may serve as a structural part of the system thereby minimizing stress on motors, generators, clutch systems which could be experienced from the vehicle dynamics, frame and body twisting or bending, etc. With a robust housing, such a design may tend to extend the life and durability of motors, generators, and clutch components and/or allow the use of lighter duty components that may not need to be designed to survive all the vehicle torsional and dynamics via their own design. In addition, the housing may be designed to be water-tight for amphibious applications or to allow the use of lower cost non-environmental components.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A powertrain for a Hybrid Electric Vehicle (HEV), said powertrain comprising:
   a prime mover;
   a first electric motor-generator, said first electric motor-generator mechanically coupled to said prime mover via a first clutch;
   a second electric motor-generator, said second electric motor-generator mechanically coupled to said first electric motor-generator via a second clutch;
   said first clutch and said second clutch configured to affect dynamic open/closed/slip operation;
   a battery, said battery electrically coupled to said first electric motor-generator and said second electric motor-generator, said battery configured to supply electrical energy to said first electric motor-generator and said second electric motor-generator; and
   a controller, said controller configured to supply control signals to said prime mover, said first clutch, said first electric motor-generator, said second clutch and said second electric motor-generator such that said controller is configured to dynamically transition between a plurality of operating modes;
   wherein further said plurality of operating modes comprises one of a group, said group comprising: all electric mode, high-torque electric mode, series mode, high regeneration mode, series-parallel mode and parallel mode.

2. The powertrain of claim 1 wherein said HEV is one of a group, said group comprising: a hybrid electric vehicle and a plug-in hybrid electric vehicle.

3. The powertrain of claim 2 wherein said REV is one of a group, said group comprising: a rear-wheel drive powertrain, a front-wheel drive powertrain and an all-wheel drive powertrain.

4. The powertrain of claim 2 wherein said HEV further comprises a wall charger.

5. The powertrain of claim 4 wherein said HEV further comprises a battery management system.

6. The powertrain of claim 2 wherein said powertrain further comprises a housing, said housing mechanically coupled to said HEV and further wherein said housing is sized to contain at least one or more components of said powertrain, said components comprising one of a group, said group comprising: said prime mover, said first clutch, said first electric motor-generator, said second clutch and said second electric motor-generator.

7. The powertrain of claim 6 wherein said housing further comprises a cooling conduit, said cooling conduit configured to guide a flow of cooling fluid past one or more of said components.

8. The powertrain of claim 6 wherein said housing further comprises a material configured to provide electro-magnetic compatibility.

9. The powertrain of claim 8 wherein said material comprises one of a group, said group comprising: aluminum, copper, nickel and chrome.

10. The powertrain of claim 1 wherein said vehicle comprises a gross vehicle weight substantially in the range of 6000 lbs to 10,000 lbs, said prime mover is an engine of substantially 2.7 L displacement, said second electric motor-generator comprises substantially at least 80 kW peak power and substantially at least 900 Nm peak torque, said first electric motor-generator comprises substantially at least 50 kW peak power and substantially at least 300 Nm peak torque and said battery comprises a capacity of substantially in the range of 5 to 21 kWh.

11. The powertrain of claim 1 wherein said vehicle comprises a gross vehicle weight substantially in the range of 14,000 lbs to 26,000 lbs, said prime mover is an engine of substantially 4.5 L displacement, said second electric motor-generator comprises substantially at least 110 kW peak power and substantially at least 1400 Nm peak torque, said first electric motor-generator comprises substantially at least 50 kW peak power and substantially at least 600 Nm peak torque and said battery comprises a capacity of substantially in the range of 5 to 27 kWh.

12. The powertrain of claim 1 wherein said vehicle comprises a gross vehicle weight substantially in the range of 10,000 lbs to 14,000 lbs, said prime mover is an engine of substantially 2.7 L displacement, said second electric motor-generator comprises substantially at least 90 kW peak power and substantially at least 1200 Nm peak torque, said first electric motor-generator comprises substantially at least 50 kW peak power and substantially at least 400 Nm peak torque and said battery comprises a capacity of substantially in the range of 5 to 24 kWh.

13. The powertrain of claim 1 wherein said vehicle comprises a gross vehicle weight less than 6000 lbs, said prime mover is an engine of substantially 2.0 L displacement, said second electric motor-generator comprises substantially at least 50 kW peak power and substantially at least 500 Nm peak torque, said first electric motor-generator comprises substantially at least 50 kW peak power and substantially at least 200 Nm peak torque and said battery comprises a capacity of substantially in the range of 5 to 16 kWh.

14. The powertrain of claim 1 wherein said vehicle comprises a gross vehicle weight less than 4000 lbs, said prime mover is an engine of substantially in the range of 0.5 L to 2.0 L displacement, said second electric motor-generator comprises substantially at least 75 kW peak power and substantially at least 300 Nm peak torque, said first electric motor-generator comprises substantially at least 35 kW peak power and substantially at least 200 Nm peak torque and said battery comprises a capacity of substantially in the range of 3 to 16 kWh.

* * * * *